United States Patent
Kwan

(10) Patent No.: US 10,091,308 B2
(45) Date of Patent: Oct. 2, 2018

(54) METHOD OF PROVIDING NUMBER URL SERVICE

(71) Applicant: GIGAKOREA CO., LTD., Dong-gu, Kwangju-si (KR)

(72) Inventor: Oh Seok Kwan, Seongnam-si (KR)

(73) Assignee: GIGAKOREA CO., LTD. (KR)

( * ) Notice: Subject to any disclaimer, the term of this patent is extended or adjusted under 35 U.S.C. 154(b) by 357 days.

(21) Appl. No.: 15/101,897

(22) PCT Filed: Sep. 19, 2014

(86) PCT No.: PCT/KR2014/008725
§ 371 (c)(1),
(2) Date: Jun. 3, 2016

(87) PCT Pub. No.: WO2015/111820
PCT Pub. Date: Jul. 30, 2015

(65) Prior Publication Data
US 2017/0041405 A1   Feb. 9, 2017

(30) Foreign Application Priority Data
Jan. 27, 2014 (KR) .................. 10-2014-0009708

(51) Int. Cl.
| | |
|---|---|
| *G06F 15/173* | (2006.01) |
| *H04L 29/08* | (2006.01) |
| *H04L 29/06* | (2006.01) |
| *H04L 29/12* | (2006.01) |
| *G06F 15/16* | (2006.01) |

(52) U.S. Cl.
CPC ...... *H04L 67/146* (2013.01); *H04L 29/08072* (2013.01); *H04L 61/304* (2013.01); *H04L 67/02* (2013.01); *H04L 67/42* (2013.01); *H04L 29/06* (2013.01); *H04L 67/025* (2013.01)

(58) Field of Classification Search
CPC ......... H04L 29/06; H04L 67/12; H04L 65/60; H04L 47/25
USPC ............... 709/220, 224, 226, 228; 370/392; 715/709
See application file for complete search history.

(56) References Cited

U.S. PATENT DOCUMENTS

| | | | |
|---|---|---|---|
| 9,991,995 B2* | 6/2018 | Hedayat | .............. H04L 65/4076 |
| 2002/0054052 A1* | 5/2002 | Sharma | ............. G06F 17/30905 715/700 |

(Continued)

*Primary Examiner* — Khanh Q Dinh
(74) *Attorney, Agent, or Firm* — Renaissance IP Law Group LLP

(57) ABSTRACT

The present invention relates to a method of providing a number URL service. One embodiment of the present invention can provide a method of providing a number URL service using a number URL as a primary domain, the method being capable of displaying all websites of a population of six billion on a single screen by expressing each of the websites by a five-digit number URL, allowing a user to use six billion websites by a single login, without re-login, and allowing the intuitional creation and management of each website. The problem-solving means of the present invention allows the maintenance of a website without paying maintenance fees by using a primary domain, allows people all around the world to switch between six billion or more websites on a single screen by a single login, without re-login, and also allows the integrated use of points.

11 Claims, 6 Drawing Sheets

(56) References Cited

U.S. PATENT DOCUMENTS

| | | | | |
|---|---|---|---|---|
| 2004/0029076 A1* | 2/2004 | Nowack | .................. | A61C 13/24 |
| | | | | 433/187 |
| 2004/0210567 A1* | 10/2004 | Bourdoncle | ...... | G06F 17/30696 |
| 2006/0029076 A1* | 2/2006 | Namihira | ............ | H04L 29/1233 |
| | | | | 370/392 |
| 2006/0031466 A1* | 2/2006 | Kovach | ............... | H04L 43/0864 |
| | | | | 709/224 |
| 2007/0083813 A1* | 4/2007 | Lui | ..................... | G06F 11/3612 |
| | | | | 715/709 |
| 2008/0098311 A1* | 4/2008 | Delarue | ............ | G06F 17/30274 |
| | | | | 715/739 |
| 2012/0066378 A1* | 3/2012 | Lui | ..................... | G06F 11/3612 |
| | | | | 709/224 |

\* cited by examiner

METHOD OF PROVIDING NUMBER URL SERVICE

TECHNICAL FIELD

The present invention relates to a method for providing a number URL service.

BACKGROUND ART

Recently, as the number of websites and mobile sites is suddenly increased, URLs assigned to respective sites are diversified. A user who has joined a site does not frequently visit the corresponding site because he or she does not remember the URL, ID and password of the corresponding site. Accordingly, a user tends to visit only a specific site that has invested lots of advertising costs.

In this case, a method for providing a URL using a number includes a method for setting a telephone number as a URL. In relation to the method, Korean Patent Application Publication No. 2003-0004849 (Jan. 15, 2003) discloses a method for accessing a website using a personal telephone number as a parameter.

However, the telephone number is only a change from letters to numbers and is not a primary domain. Furthermore, since the telephone number is mapped to a secondary domain as a parameter, maintenance and management fees needs to be paid to use the URL of the secondary domain, and redundant numbers may be generated between countries. Accordingly, telephone numbers cannot be used as unique identifiers and all of 6 billion persons cannot be identified using telephone numbers.

DISCLOSURE

Technical Problem

An embodiment of the present invention can provide a method for providing a number URL service, wherein a number URL, that is, a primary domain, is used, all of sites of 6 billion persons can be displayed on one screen by representing the sites using a 5-digit number URL, 6 billion sites can be used without re-login through one login, the opening and maintenance of each site can be intuitively performed. However, technical objects to be achieved by the present embodiment are not limited to the aforementioned object, and other technical objects may be present.

Technical Solution

As technical means for achieving the above object, an embodiment of the present invention includes the steps of receiving a User Interface (UI) selection signal to select at least one country UI from at least one user terminal, outputting a number URL frame in response to the received UI selection signal, when a first digit selection signal to select any one of the blanks of the first row of the number URL frame is received from the at least one user terminal, changing the center frame of the number URL frame including the at least one blank in response to the received first digit selection signal, when a second digit selection signal to select any one of the blanks of the first column of the number URL frame is received from the at least one user terminal, changing the center frame of the number URL frame including the at least one blank in response to the received second digit selection signal, when a third digit selection signal to select any one of the blanks of the N-th (N=a natural number) column of the number URL frame is received from the at least one user terminal, changing the center frame of the number URL frame including the at least one blank in response to the received third digit selection signal, when a fourth digit selection signal to select any one of the blanks of the M-th (M=a natural number) row of the number URL frame is received from the at least one user terminal, changing the center frame of the number URL frame including the at least one blank in response to the received fourth digit selection signal, and when a fifth digit selection signal to select any one of the blanks of the center frame which has been finally changed is received from the at least one user terminal, outputting a site mapped to the received fifth digit selection signal.

Advantageous Effects

In accordance with the technical solution of the present invention, a site can be maintained even without paying maintenance fees because a primary domain is used, a cosmopolitan can move to 6 billion or more sites on a single screen without re-login through one login, and points can be used in an integrated way.

MODE FOR INVENTION

Figure 1:
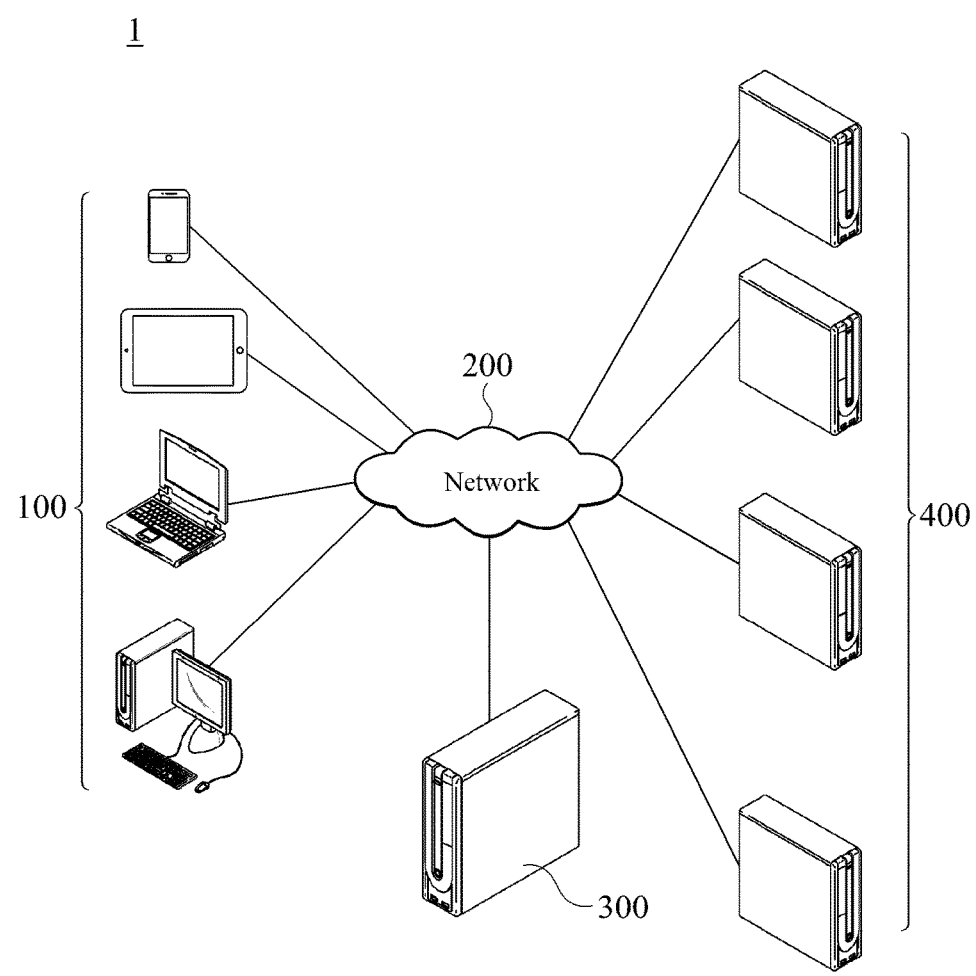
FIG. 1 is a configuration diagram for illustrating a system for providing a number URL service according to an embodiment of the present invention.

Hereinafter, embodiments of the present invention are described in detail with reference to the accompanying drawings so that the embodiments may be easily practiced by a person having ordinary skill in the art to which the present invention pertains. However, the present invention may be modified in various different ways and is not limited to the embodiments described herein. Furthermore, in the drawings, in order to clarify a description of the present invention, a description of parts not related to the description is omitted, and similar reference numbers are used throughout the specification to refer to similar parts.

Throughout this specification, when it is described that one element is "connected" to the other element, the one element may be "directly connected" to the other element or may be "electrically connected" to the other element through a third element. Furthermore, when it is said that one element "comprises" the other element, the word "comprise" will be understood to imply the inclusion of stated elements but not the exclusion of any other elements, unless explicitly described to the contrary, and should not be understood that they exclude the existence or possible addition of one or more other characteristics, numbers, steps, operations, elements, parts, or combinations of them in advance.

Hereinafter, the present invention is described in detail with reference to the accompanying drawings.

FIG. 1 is a configuration diagram for illustrating a system for providing a number URL service according to an embodiment of the present invention. Referring to FIG. 1, the system 1 for providing a number URL service according to an embodiment of the present invention may include at least one user terminal 100, a number URL service providing server 300, and at least one site server 400. However, the system 1 for providing a number URL service in FIG. 1 is only an embodiment of the present invention, and the present invention is not construed as being limited to the system 1 of FIG. 1.

In this case, in general, the elements of FIG. 1 are connected over a network 200. For example, as shown in FIG. 1, the at least one user terminal 100 and the number URL service providing server 300 may be connected over the network 200. Furthermore, the number URL service providing server 300 may be connected to the at least one site server 400 over the network 200. Furthermore, the at least one user terminal 100 may be connected to the at least one site server 400 via the number URL service providing server 300 over the network 200.

In this case, the network 200 means a connection structure through which nodes, such as terminals and servers, can exchange information. An example of the network 200 includes the Internet, a Local Area Network (LAN), a Wireless LAN (WLAN), a Wide Area Network (WAN), a Personal Area Network (PAN), 3G, 4G, LTE, Wi-Fi or the like, but the present invention is not limited thereto. The at least one user terminal 100, the number URL service providing server 300 and the at least one site server 400 shown in FIG. 1 are not construed as being limited to those shown in FIG. 1.

The at least one user terminal 100 may be a terminal which accesses the number URL service providing server 300 and searches the at least one site server 400. For example, the at least one user terminal 100 may be a terminal which inputs at least 6-digit number and accesses at least one site mapped to the inputted number. In this case, the at least 6-digit number may include (a, b, c, d, e), for example. Each of a, b, c, and d may have a 2-digit number, and e may have a 3-digit number. Accordingly, a, b, c, d, e may be (12, 1, 10, 9, 140), for example. In this case, the number URL may be 12 1 10 9 140. That is, the number URL may include a 5-digit number, a 5-blank number. A 2-digit number or a 3-digit number may be displayed in each blank. In this case, the number URL may be configured so that URLs are assigned to all of 6 billion persons as numbers in order to avoid URLs displayed in the English language or the Hangeul language or other languages. This is described in detail later. In this case, the at least one user terminal 100 may be implemented using a computer capable of accessing a server or a terminal at a remote place over the network 200. In this case, the computer may include a notebook, a desktop or a laptop on which a web browser has been mounted, for example. Furthermore, the at least one user terminal 100 may be implemented using a terminal capable of accessing a server or a terminal at a remote place over the network 200. The at least one user terminal 100 is a wireless communication device whose portability and mobility are guaranteed, for example, and may include all types of handheld-based wireless communication devices, such as a Personal Communication System (PCS), Global System for Mobile communications (GSM), a Personal Digital Cellular (PDC), a Personal Handyphone System (PHS), a Personal Digital Assistant (PDA), International Mobile Telecommunication (IMT)-2000, Code Division Multiple Access (CDMA)-2000, W-Code Division Multiple Access (W-CDMA), a Wireless Broadband Internet (Wibro) terminal, a smart phone, a smart pad, and a tablet PC.

When the at least one user terminal 100 accesses the number URL service providing server 300 and inputs a number URL, the number URL service providing server 300 may relay the at least one user terminal 100 and the at least one site server 400 by connecting the at least one site server 400 mapped to the inputted number URL. In this case, the number URL service providing server 300 may be implemented using a computer capable of accessing a server or a terminal at a remote place over the network 200. In this case, the computer may include, for example, a notebook, a desktop or a laptop on which a web browser has been mounted.

The at least one site server 400 may provide a site mapped to a number URL. In this case, each site provided by the at least one site server 400 may be mapped to a 5-digit number URL. In this case, at least one site may have its unique URL and may be mapped to a number URL or may directly have a number URL. In this case, the at least one site server 400 may be implemented using a computer capable of accessing a server or a terminal at a remote place over the network 200. In this case, the computer may include, for example, a notebook, a desktop or a laptop on which a web browser has been mounted.

Figure 2:
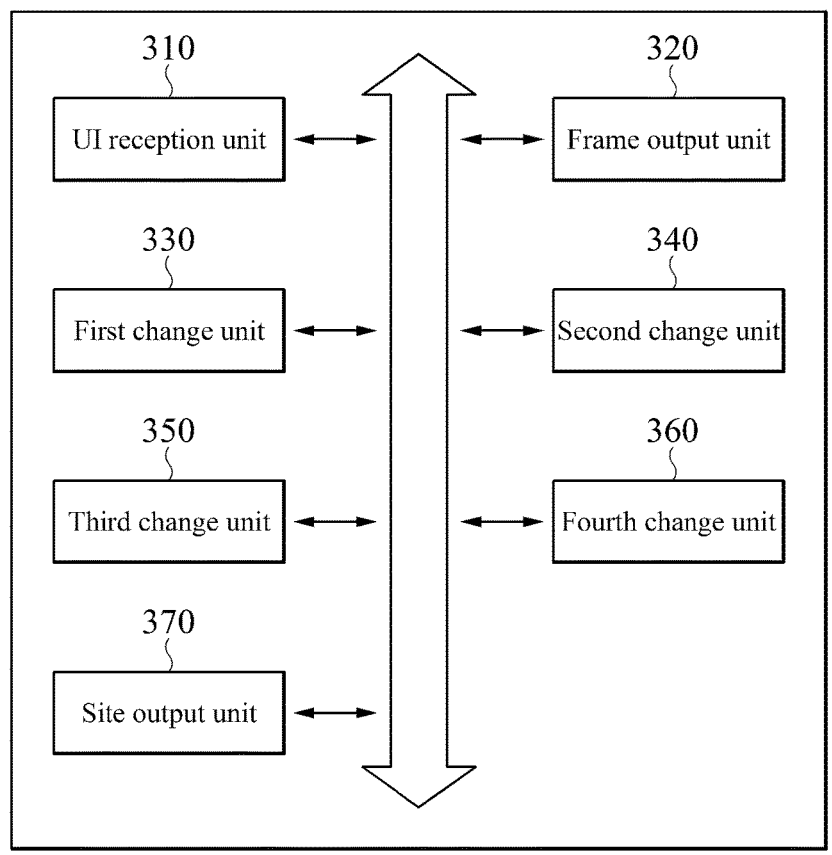
FIG. 2 is a configuration diagram for illustrating a number URL service providing server shown in FIG. 1.
Figure 3:
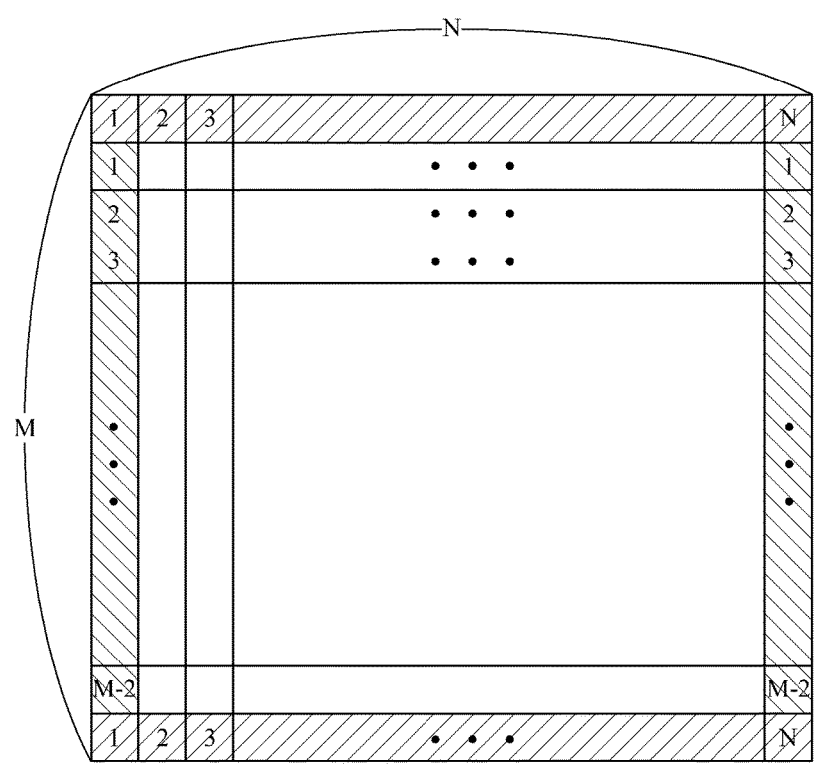
FIGS. 3 and 4 are diagrams showing an embodiment in which a number URL service has been implemented in a site provided by the number URL service providing server shown in FIG. 1.
Figure 4:
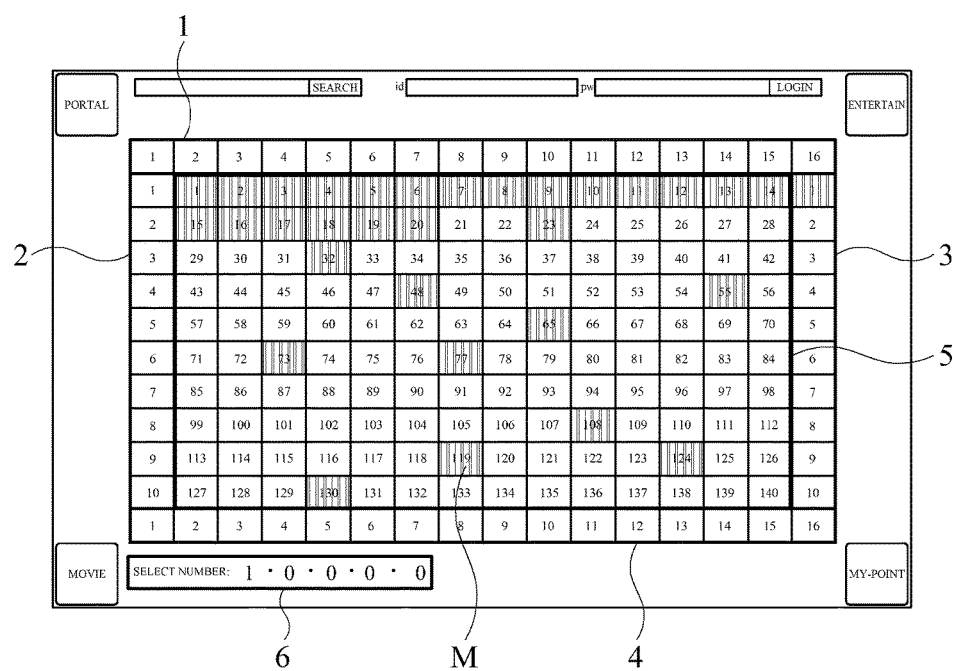

FIG. 2 is a configuration diagram for illustrating the number URL service providing server shown in FIG. 1, and FIGS. 3 and 4 are diagrams showing an embodiment in which a number URL service has been implemented in a site provided by the number URL service providing server shown in FIG. 1.

Referring to FIG. 2, the number URL service providing server 300 according to an embodiment of the present invention may include a UI reception unit 310, a frame output unit 320, a first change unit 330, a second change unit 340, a third change unit 350, a fourth change unit 360, and a site output unit 370.

When the number URL service providing server 300 or another server (not shown) operating in conjunction with the number URL service providing server 300 according to an embodiment of the present invention transmits a number URL service application, a program or a web page to the at least one user terminal 100 or the at least one site server 400, the at least one user terminal 100 or the at least one site server 400 may install or open an application, program or web page for a corresponding service. Furthermore, a service program may be driven in the at least one user terminal 100 using scripts executed in a web browser. In this case, the web browser is a program that enables a World Wide Web (WWW) service to be used, and means a program which receives and displays hyper text described in Hyper Text Mark-up Language (HTML). The web browser includes Netscape, Explorer, Chrome and so on, for example. Furthermore, the application means an application on a terminal and includes app executed in a mobile terminal (smart phone), for example.

In this case, a connection to the network 200 means generating a communication object at a communication contact point for communication with a terminal which is connected to the at least one user terminal 100, the number URL service providing server 300 or the at least one site server 400 over the network 200. The number URL service providing server 300 may exchange data through the communication object.

A number URL is first described, and the elements of the number URL service providing server 300 are then described.

In general, a URL has a secondary domain format, such as www.####.co.kr. #### is the unique identification letters of a site, co are letters indicative of a company, and kr are letters for identifying a country. Recently, as the number of sites is suddenly increased, it is not easy to find unique identification letters that are not redundant if a common URL is used. That is, it is not easy to find unique identification letters which are not redundant while using all of 6 billion persons in each country. Furthermore, maintenance fees for the URL of a secondary domain need to be paid every 2 years because the URL of the secondary domain is used. If the maintenance fees are carelessly paid, in most cases, a site that is opened with difficulty is closed.

Accordingly, a number URL according to an embodiment of the present invention is configured to provide 6 billion or more number URLs capable of being used by 6 billion persons, that is, primary domains. That is, the number URL service providing server 300 provides a screen on which a 5-digit number can be entered through one screen. When a blank corresponding to a corresponding number is pressed, the number URL service providing server 300 may provide a site mapped to the corresponding number URL. If such a number URL is used, although 6 billion persons have respective sites, all of the sites owned by the 6 billion persons may be mapped to 5-digit number URLs. Accordingly, unique identification letters do not need to be found with difficulty, and site maintenance fees that must be paid due to the use of the letter URL of a secondary domain do not need to be paid because a number URL, that is, a primary domain, is used. A driving principle thereof is described in later.

The UI reception unit 310 may receive a UI selection signal for selecting at least one country User Interface (UI) from the at least one user terminal 100.

The frame output unit 320 may output a number URL frame in response to a received UI selection signal. In this case, the number URL frame may be a frame having N×M (N,M=natural numbers) blanks as shown in FIG. 3. In this case, whenever a country UI is selected, a frame having N×M blanks may be generated.

When a first digit selection signal to select any one of the blanks of the first row of the number URL frame is received from the at least one user terminal 100, the first change unit 330 may change the center frame of the number URL frame, which includes the at least one blank, in response to the received first digit selection signal. In this case, the first digit may be the first digit of a number URL having (a, b, c, and d, e), that is, a digit corresponding to a. Referring to FIG. 3, the first row includes N blanks, and the center frame includes (N−2)·(M−2) blanks. Whenever any one of the blanks of the first row is selected, (N−2)·(M−2) blanks are changed, and thus a total of N·(N−2)·(M−2) blanks may be displayed.

For example, referring to FIG. 4, the first row 1 may include 16 blanks, and a first digit may be the first digit of the number URL 6. In this case, the center frame 5 includes 14×10=140 blanks. In this case, whenever any one of the blanks of the first row is selected, 140 blanks are changed. That is, when 1, that is, the first blank of the first row, is pressed by a user, 140 blanks are displayed. When 2, that is, the second blank of the first row, is pressed by a user, other 140 blanks are displayed. In this case, numbers assigned to the 140 blanks of the center frame 5 are not changed, but a number displayed whenever each of the blanks included in the first row is pressed is a number having different attributes. That is, since (1 0 0 0 140) and (2 0 0 0 140) are different number URLs, a number is defined to have different attributes although numbers assigned to the center frame are the same. Accordingly, the blanks of the first row may be displayed using 140 number URLs. If all of the blanks of the first row are used, 16×140=2240 number URLs may be represented. Furthermore, a blank M of the center frame 5 which has been gray-out processing indicates that a mapped site is present.

Referring back to FIG. 2, when a second digit selection signal to select any one of the blanks of the first column of the number URL frame is received from the at least one user terminal 100, the second change unit 340 changes the center frame of the number URL frame, which includes the at least one blank, in response to the received second digit selection signal. In this case, the second digit may be the second digit of a number URL including (a, b, c, and d, e), that is, a digit corresponding to b. Referring to FIG. 3, a first column includes M−2 blanks. Whenever any one of the blanks of the first column is selected, N·(N−2)·(M−2) blanks may be changed, and a total of (M−2)·N·(N−2)·(M−2) blanks may be displayed.

For example, referring to FIG. 4, a first column 2 may include 10 blanks, and a second digit may be the second digit of the number URL 6. In this case, a center frame 5 includes 14×10=140 blanks. Furthermore, as described above, since the first digit of the first row has been selected, 2240 blanks, that is, the numbers of all URLs represented in the first row, are changed by taking into consideration the numbers of all cases. That is, when 1, that is, the first blank of the first column, is pressed by a user, 2240 blanks may be displayed. When 2, that is, the second blank of the first column, is pressed by a user, other 2240 blanks may be displayed. This is a result calculated by taking into consideration the numbers of all cases in which the number of the first digit has been selected in the first row. Accordingly, each of the blanks of the first column may indicate 2240 number URLs. If all of the blanks of the first column may represent 2240×10=22400 number URLs.

Returning back to FIG. 2, when a third digit selection signal to select any one of the blanks of the N-th column of the number URL frame is received from the at least one user terminal 100, the third change unit 350 may change the center frame of the number URL frame, which includes the at least one blank, in response to the received third digit selection signal. In this case, the third digit may be the third digit of a number URL having (a, b, c, and d, e), that is, a digit corresponding to c. Referring to FIG. 3, the N-th column may include M−2 blanks. Whenever any one of the blanks of the N-th column is selected, (M−2)·N·(N−2)·(M−2) blanks are changed, and a total of (M−2)·(M−2)·N·(N−2)·(M−2) blanks may be displayed.

For example, referring to FIG. 4, an N-th column 3 includes 10 blanks, and a third digit may be the third digit of the number URL 6. In this case, a center frame 5 includes 14×10=140 blanks. Furthermore, as described above, since the first digit of the first row has been selected and the second digit of the first column has been selected, 22400 blanks, that is, the numbers of all URLs represented in the first row and the first column, are changed by taking into consideration the numbers of all cases. That is, when 1, that is, the first blank of the N-th column, is pressed by a user, 22400 blanks may be displayed. When 2, that is, the second blank of the N-th column, is pressed by a user, other 22400 blanks may be displayed. This is a result calculated by taking into consideration the numbers of all cases in which all of the numbers of the first digit are selected in the first row and all of the numbers of the second digit are selected in the first column. Accordingly, each of the blanks of the N-th column may indicate 22400 number URLs. If all of the blanks of the N-th column are used, 22400×10=224000 number URLs may be represented.

Referring back to FIG. 2, when a fourth digit selection signal to select any one of the blanks of the M-th column of the number URL frame is received from the at least one user terminal 100, the fourth change unit 360 may change the center frame of the number URL frame, which includes the at least one blank, in response to the received fourth digit selection signal. In this case, the fourth digit may be the fourth digit of a number URL having (a, b, c, and d, e), that is, a digit corresponding to d. Referring to FIG. 3, the M-th row may include N blanks. Whenever any one of the blanks of the M-th column is selected, (M−2)·(M−2)·N(N−2)·(M−2) blanks are changed, and a total of N·(M−2)·(M−2)·N·(N−2)·(M−2) blanks may be displayed.

For example, referring to FIG. 4, the M-th row 4 may include 16 blanks, and a sixth digit may be the fourth digit of the number URL 6. In this case, a center frame 5 includes 14×10=140 blanks. Furthermore, as described above, since the first digit of the first row has been selected, the second digit of the first column has been selected, and the third digit of the N-th column has been selected, 224000 blanks, that is, the numbers of all URLs represented in the first row, the first column and the N-th column, are changed by taking into consideration the numbers of all cases. That is, when 1, that is, the first blank of the M-th row, is pressed by a user, 224000 blanks may be displayed. When 2, that is, the second blank of the M-th row, is pressed by a user, other 224000 blanks may be displayed. This is a result calculated by taking into consideration the numbers of all cases in which all of the numbers of the first digit are selected in the first row, all of the numbers of the second digit are selected in the first column, and all of the numbers are selected in the N-th column. Accordingly, each of the blanks of the M-th row may indicate 224000 number URLs. If all of the blanks of the M-th row are used, 224000×16=3584000 number URLs may be represented.

Referring back to FIG. 2, when a fifth digit selection signal to select any one of the blanks of a center frame that has been finally changed is received from the at least one user terminal 100, the site output unit 370 may output a site mapped to the received fifth digit selection signal. In this case, the fifth digit may be any one of 140 blanks as shown in FIG. 4. That is, the fifth digit may be any one of numbers from 1 to 140.

Furthermore, at least one UI is U in number. Whenever at least one UI is selected, N·(M−2)·(M−2)·N·(N−2)·(M−2) blanks may be changed, and a total of U·N·(M−2)·(M−2)·N·(N−2)·(M−2) blanks may be displayed. That is, referring to FIG. 4, at least one UI is U (U=a natural number), and the number of number URLs that may be indicated in the center frame 5 is 3584000 as described above. Accordingly, blanks corresponding to a total of 3584000× (U) may be indicated. In an embodiment of the present invention, both × and are · defined as multiplying operators.

Accordingly, although each of 6 billion persons owns each site, number URLs can be assigned to all of the 6 billion persons without a redundant number URL.

In summary, in a center frame including at least one blank, a series of numbers are indicated in each at least one blank. Whenever the first selection signal to the fourth selection signal are received, attribute information for the at least one blank may be changed. Furthermore, a site is mapped to a number URL address corresponding to the first digit selection signal to the fifth digit selection signal, and the number URL address is written as a, b, c, d, and e. a may be the number of a first digit corresponding to the first digit selection signal. b may be the number of a second digit corresponding to the second digit selection signal. c may be the number of a third digit corresponding to the third digit selection signal. d may be the number of a fourth digit corresponding to the fourth digit selection signal. e may be the number of a fifth digit corresponding to the fifth digit selection signal.

Meanwhile, when a site mapped to the fifth digit selection signal is logged in, the number URL service providing server 300 may provide a single sign-on function so that re-login to a site mapped to any one of the blanks of a center frame is not required. That is, the number URL service providing server 300 may be a server which enables the user terminal 100 to automatically log in to a first site through an i-PIN ID and password and to automatically log in to a second site through the first site. Likewise, the number URL service providing server 300 may be a server which enables the user terminal 100 to automatically log in to a second site through an i-PIN ID and password and to automatically log in to a first site through the second site. The number URL service providing server 300 may extract duplication information mapped to an i-PIN ID and password and first domain information about a first site, may check whether the user terminal 100 has joined the second site based on the extracted duplication information, the extracted first domain information, and the i-PIN ID, and may perform automatic login on access to the second site of the user terminal 100 using the duplication information, the first domain information, and the i-PIN ID if the user terminal 100 has joined the second site. In this case, input for access to the second site of the user terminal 100 may be input corresponding to the clicking of a banner placed in the first site so that the second site is connected.

Furthermore, at least one site may be mapped to a center frame including at least one blank, and the center frame may be stored. A point accumulated in at least one site may be managed as an integration point. That is, the number URL service providing server 300 may be a server which generally manages a point use event generated in at least one site provided by the at least one site server 400. In this case, when an event that uses a point in the user terminal 100 is generated, the number URL service providing server 300 may check whether the corresponding point is a point capable of being settled up in any one site server 400. If the corresponding point is a point capable of not being settled up, the number URL service providing server 300 may receive a parameter from any one site server 400 and process point settlement in association with the at least one site server 400. Furthermore, the number URL service providing server 300 may be a server which enables the integrated login of the user terminal 100 based on a single sign-on method and which integrates and sums points generated as the results of the purchasing of the user terminal 100. Furthermore, when a point use event is generated due the settlement of the user terminal 100, the number URL service providing server 300 may perform the settlement corresponding to the point use event in association with the at least one site server 400. In this case, the point use event of the user terminal 100 is not limited to an on-line site, but may include an offline member store. Accordingly, the number URL service providing server 300 enables the user terminal 100 to use points that are integrated and accumulated without distinction of online or offline and enables the distributed points of the user terminal 100 to be integrated and used.

Furthermore, in at least one site mapped to a center frame including at least one blank, at least one user interface may be deleted, edited, generated, moved, rearranged, and resized in a drag & drop manner. That is, the number URL service providing server 300 may provide a tool that enables the user of the at least one user terminal 100 to directly construct and manage a site in addition to the association of the site. Accordingly, the number URL service providing server 300 provides an integrated business solution in accordance with a platform, already constructed in the number URL service providing server 300, based on at least one integrated database (not shown). In this case, the already constructed platform may include at least one of a shopping mall, a homepage, a builder system providing an SNS service, an editor system capable of producing web content, a member store, an application based on a store and store management, a settlement system capable of profit distributions and sales settlement, an online shopping mall and POS system, a reserve card system, a delivery system, and Enterprise Resource Planning (ERP) system for member management, sales management, sales management, store management, inventory management, and member store management. In this case, the builder system may be based on an All Plex method in which an icon can be enlarged, reduced, and rotated horizontally and vertically in response to an input to a mouse interface or a touch-based interface. For example, in order for a small-size self-employed person to obtain an individual distinction with respect to his or her own shopping mall, the design of the shopping mall needs to be easily changed. Accordingly, the builder system provides the All Plex method so that an operator can operate a required customized shopping mall. Furthermore, if an upper menu UI is changed based on input to a user interface on a frame displayed in the edge area of a web page, the editor system may change a lower menu UI in response to the changed upper menu UI. In this case, the editor system may group menu items based on each classification criterion and hierarchically classify the menu items from the upper menu to the lower menu. If any one of the upper menu is selected, the editor system may display a middle menu so that it corresponds to the selected upper menu. Furthermore, when any one of a middle menu is selected, the editor system may display content information about a lower menu, which corresponds to the selected middle menu.

That is, the method for providing a number URL service according to an embodiment of the present invention can provide a basic frame i) which is applied to bidirectional single sign-on technologies (hereinafter written on the basis of application nos. Nos. 2010-0084141, 2013-0079554, 2013-0079555, and 2013-0079556) so that all of sites can be used through one login even in 60 billion or more sites without re-login, ii) which is applied to shopping mall production and operation technologies (Nos. 2010-0075130, 2010-0084142, 2010-0084770, 2010-0084771, 2010-0084772, 2009-0084710, 2010-0084773, 2010-0090030, 2010-0090031, 2011-0081034, 2011-0081037, 2012-0014373, 2012-0039245, 2012-0089494, and 2012-0099897) so that already generated shopping malls are associated and the shopping malls themselves can be produced and modified, iii) in which integration points of 60 billion sites can be managed through integration point technologies (Nos. 2010-0075131, 2013-0079558, 2013-0081974, and 2013-0146293) and points can be integrated, and iv) which enables a POS terminal suitable for each store to be installed through POS technologies (Nos. 2013-0113631 and 2013-0113632) installed on an offline store and to be associated and used with online 60 billion sites, all of which were filed by the present applicant. Furthermore, the method for providing a number URL service according to an embodiment of the present invention may provide 60 billion sites on one screen. A number URL may be printed on a magnetic card offline and may be used like a business card along with the functions of a credit card or a point card.

In an embodiment of the present invention, the term "at least one" may be deleted depending on the plural number or the singular number, but is defined as a term that denotes the same element.

Contents not described with respect to the method for providing a number URL service in FIGS. 2, 3, and 4 are the same as the contents described with respect to the method for providing a number URL service with reference to FIG. 1 or may be easily inferred from the described contents, and thus a description thereof is omitted hereinafter.

Figure 5:
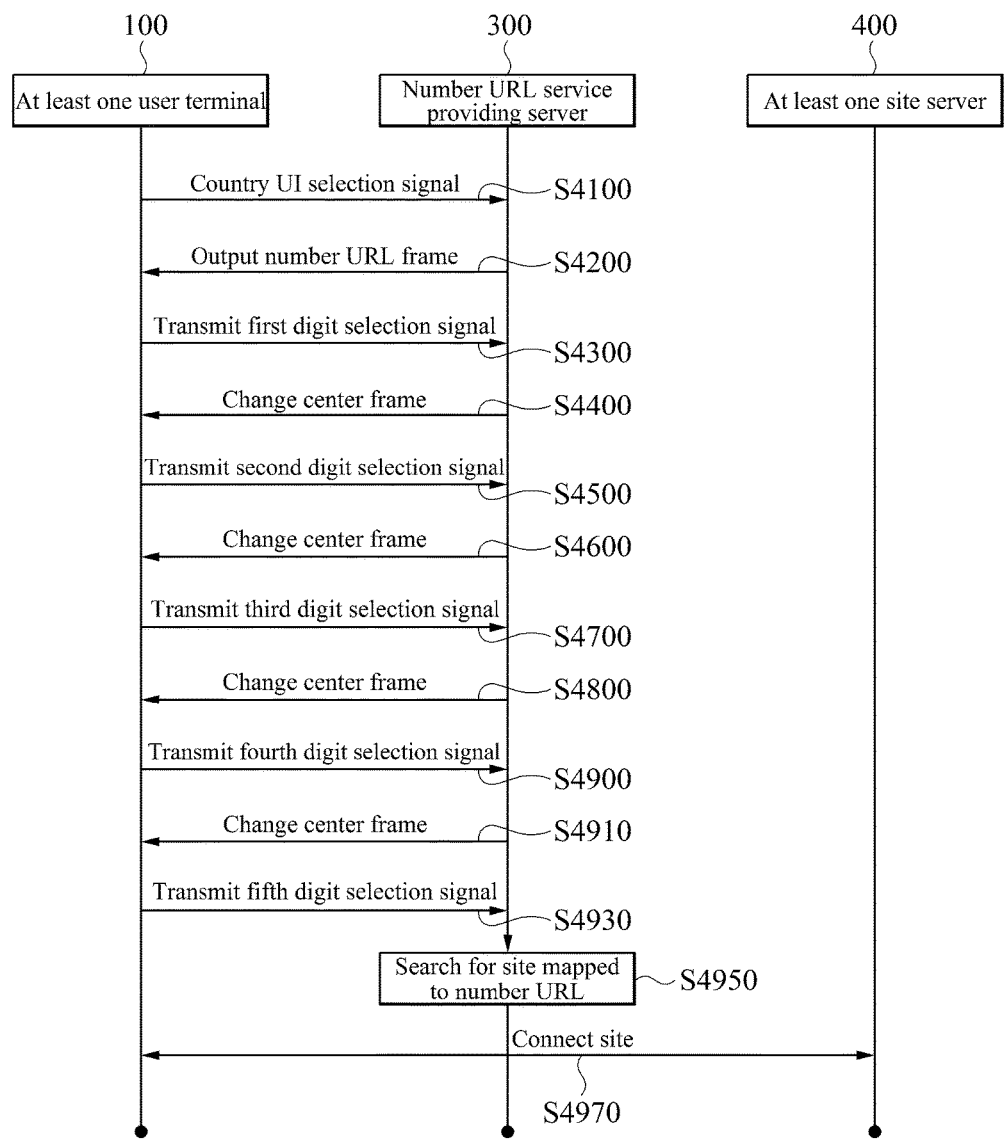
FIG. 5 is a diagram showing a process of transmitting and receiving data between the elements included in the system for providing a number URL service of FIG. 1 according to an embodiment of the present invention.

FIG. 5 is a diagram showing a process of transmitting and receiving data between the elements included in the system for providing a number URL service of FIG. 1 according to an embodiment of the present invention. An example of the process of transmitting and receiving data between the elements is described below with reference to FIG. 5, but the present invention is not construed as being limited to such an embodiment. It is evident to those skilled in the art that the process of transmitting and receiving data shown in FIG. 5 may be changed according to the aforementioned various embodiments.

Referring to FIG. 5, the at least one user terminal 100 transmits a country UI selection signal to the number URL service providing server 300 (S4100). In this case, the number URL service providing server 300 outputs a number URL frame (S4200).

Thereafter, when a first digit selection signal is transmitted by the at least one user terminal 100 (S4300), the number URL service providing server 300 changes a center frame in response to the first digit selection signal (S4400).

Next, when the at least one user terminal 100 transmits a second digit selection signal (S4500), the number URL service providing server 300 changes a center frame in response to the second digit selection signal (S4600). When the at least one user terminal 100 transmits a third digit selection signal (S4700), the number URL service providing server 300 changes a center frame in response to the third digit selection signal (S4800). When the at least one user terminal 100 transmits a fourth digit selection signal (S4900), the number URL service providing server 300 changes a center frame in response to the fourth digit selection signal (S4910).

Thereafter, when the at least one user terminal 100 transmits a fifth digit selection signal (S4930), the number URL service providing server 300 searches for a site mapped to a number URL (S4950) and connects the at least one user terminal 100 and the at least one site server 400 (S4970).

Contents not described with respect to the method for providing a number URL service in FIG. 5 are the same as the contents described with respect to the method for providing a number URL service with reference to FIGS. 1 to 4 or may be easily inferred from the described contents, and thus a description thereof is omitted hereinafter.

Figure 6:
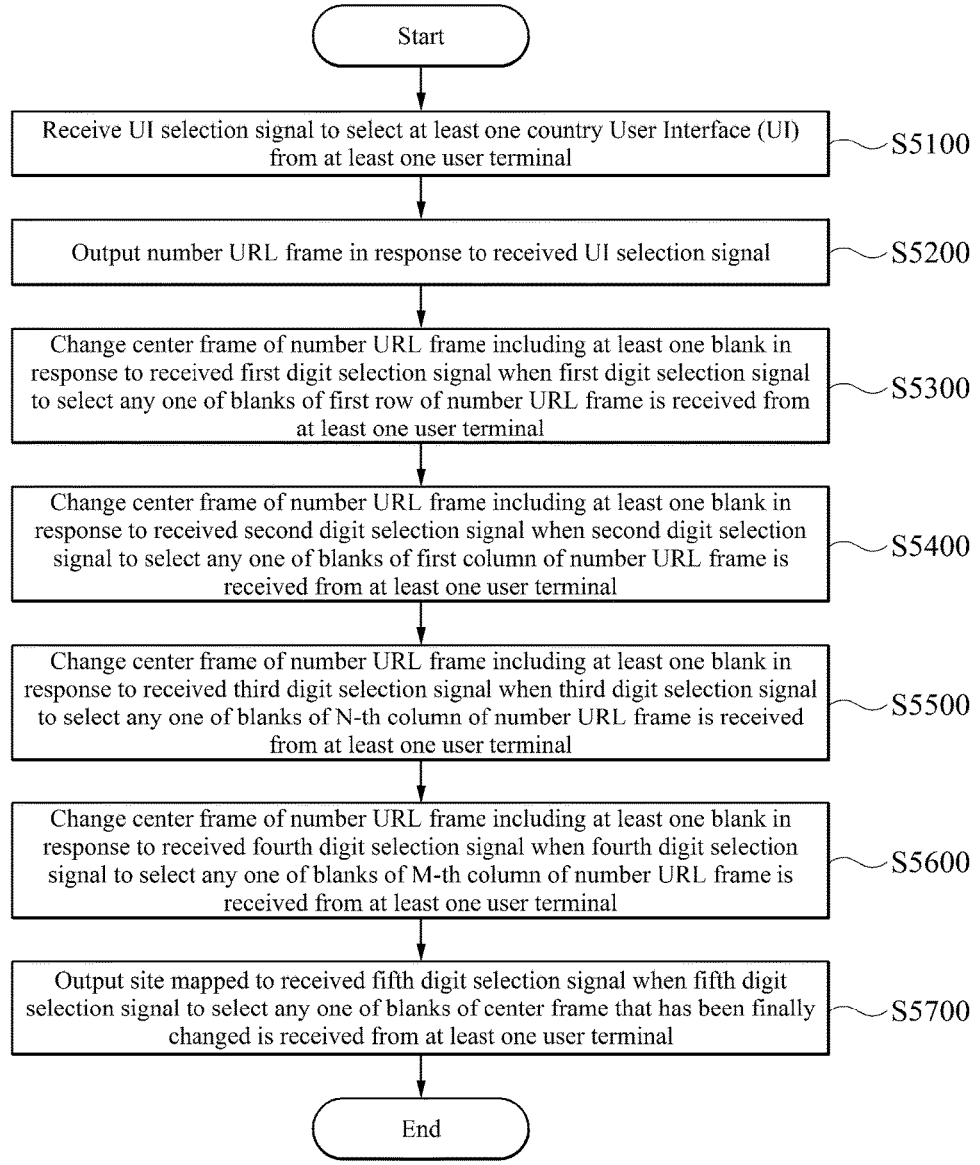
FIG. 6 is an operational flowchart for illustrating a method for providing a number URL service according to an embodiment of the present invention.

FIG. 6 is an operational flowchart for illustrating a method for providing a number URL service according to an embodiment of the present invention. Referring to FIG. 6, the number URL service providing server receives a UI selection signal to select at least one country User Interface (UI) from the at least one user terminal (S5100).

Thereafter, the number URL service providing server outputs a number URL frame in response to the received UI selection signal (S5200).

Furthermore, when a first digit selection signal to select any one of the blanks of the first row of the number URL frame is received from the at least one user terminal, the number URL service providing server changes the center frame of the number URL frame, which includes the at least one blank, in response to the received first digit selection signal (S5300).

Furthermore, when a second digit selection signal to select any one of the blanks of the first column of the number URL frame is received from the at least one user terminal, the number URL service providing server changes the center frame of the number URL frame, which includes the at least one blank, in response to the received second digit selection signal (S5400).

In this case, when a third digit selection signal to select any one of the blanks of the N-th column of the number URL frame is received from the at least one user terminal, the number URL service providing server changes the center frame of the number URL frame, which includes the at least one blank, in response to the received third digit selection signal (S5500).

Furthermore, when a fourth digit selection signal to select any one of the blanks of the M-th column of the number URL frame is received from the at least one user terminal, the number URL service providing server changes the center frame of the number URL frame, which includes the at least one blank, in response to the received fourth digit selection signal (S5600).

Finally, when a fifth digit selection signal to select any one of the blanks of a center frame that has been finally changed is received from the at least one user terminal, the number URL service providing server outputs a site mapped to the received fifth digit selection signal.

The method for providing a number URL service according to an embodiment which has been described with reference to FIG. 6 may be implemented in the form of a recording medium including a command executable by a computer, such as an application or program module executed by a computer. The computer-readable medium may be a specific available medium which may be accessed by a computer, and includes all of volatile and non-volatile media and separation type and non-separation type media. Furthermore, the computer-readable medium may include all of computer storage media and communication media. The computer storage media include all of volatile and non-volatile media and separation type and non-separation type media implemented using a specific method or technology for the storage of information, such as computer-readable commands, data structures, program modules, or other data. The communication media typically include other data or other transfer mechanisms for modulated data signals, such as computer-readable commands, data structures, program modules, or carriers, and include specific information transfer media.

The aforementioned method for providing a number URL service according to an embodiment of the present invention may be executed by an application (this may be a program included in a platform or operating system basically mounted on a terminal) basically installed on a terminal, and may be executed by an application (i.e., a program) which has been directly installed by a user on a master terminal through an application store server or application providing server, such as a web server related to an application or a corresponding service. In this sense, the aforementioned method for providing a number URL service according to an embodiment of the present invention may be implemented in the form of an application (i.e., a program) basically installed on a terminal or directly installed by a user, and may be recorded on a computer-readable recording medium, such as a terminal.

The aforementioned description is illustrative, and those skilled in the art to which the present invention pertains will appreciate that the present invention may be implemented in other detailed forms without departing from the technical spirit or essential characteristics of the present invention. Accordingly, the aforementioned embodiments should be construed as being only illustrative not as being restrictive from all aspects. For example, each of the elements described in the singular forms may be distributed and implemented. Likewise, elements described in a distributed way may also be combined and implemented.

The scope of the present invention is defined by the appended claims rather than the detailed description, and the present invention should be construed as covering all modifications or variations derived from the meaning and scope of the appended claims and their equivalents.

The invention claimed is:

1. A method for providing a number URL service which is executed by a number URL service providing server, comprising steps of:
   receiving a User Interface (UI) selection signal to select at least one country UI from at least one user terminal;
   outputting a number URL frame in response to the received UI selection signal;
   when a first digit selection signal to select any one of blanks of a first row of the number URL frame is received from the at least one user terminal, changing the center frame of the number URL frame comprising the at least one blank in response to the received first digit selection signal;
   when a second digit selection signal to select any one of blanks of a first column of the number URL frame is received from the at least one user terminal, changing the center frame of the number URL frame comprising the at least one blank in response to the received second digit selection signal;
   when a third digit selection signal to select any one of blanks of an N-th (N=a natural number) column of the number URL frame is received from the at least one user terminal, changing the center frame of the number URL frame comprising the at least one blank in response to the received third digit selection signal;
   when a fourth digit selection signal to select any one of blanks of an M-th (M=a natural number) row of the number URL frame is received from the at least one user terminal, changing the center frame of the number URL frame comprising the at least one blank in response to the received fourth digit selection signal; and
   when a fifth digit selection signal to select any one of blanks of a center frame which has been finally changed is received from the at least one user terminal, outputting a site mapped to the received fifth digit selection signal,
   wherein the center frame comprising the at least one blank indicates a series of numbers in each at least one blank, and attribute information of the at least one blank is changed whenever the first selection signal to the fourth selection signal are received.

2. The method of claim 1, wherein:
the first row comprises N blanks,
the center frame comprises (N−2)·(M−2) blanks, and
whenever any one of the blanks of the first row is selected, the (N−2)·(M−2) blanks are changed and a total of N·(N−2)·(M−2) blanks are displayed.

3. The method of claim 2, wherein:
the first column comprises M−2 blanks, and
whenever any one of the blanks of the first column is selected, the N·(N−2)·(M−2) blanks are changed and a total of (M−2)·N·(N−2)·(M−2) blanks are displayed.

4. The method of claim 3, wherein:
the N-th column comprises M−2 blanks, and
whenever any one of the blanks of the N-th column is selected, (M−2)·N·(N−2)·(M−2) blanks are changed and a total of (M−2)·(M−2)·N·(N−2)·(M−2) blanks are displayed.

5. The method of claim 4, wherein:
the M-th row comprises N blanks, and
whenever any one of the blanks of the M-th column is selected, (M−2)·(M−2)·N·(N−2)·(M−2) blanks are changed and a total of N·(M−2)·(M−2)·N·(N−2)·(M−2) blanks are displayed.

6. The method of claim 5, wherein:
the at least one UI comprises U (U=a natural number) in number, and
whenever the at least one UI is selected, N·(M−2)·(M−2)·N·(N−2)·(M−2) blanks are changed and a total of U·N·(M−2)·(M−2)·N·(N−2)·(M−2) blanks are displayed.

7. The method of claim 1, wherein the site mapped to the fifth digit selection signal has been logged in, a single sign-on function is provided so that a site mapped to any one of the blanks of the center frame does not need to be logged in again.

8. The method of claim 1, wherein:
at least one site is mapped to and stored in the center frame comprising the at least one blank, and
a point reserved in the at least one site is managed as an integration point.

9. The method of claim 1, wherein in at least one site mapped to the center frame comprising the at least one blank, at least one user interface is deleted, edited, generated, moved, rearranged, and resized in a drag & drop manner.

10. The method of claim 1, wherein:
the site is mapped to a number URL address corresponding to the first digit selection signal to the fifth digit selection signal,
the number URL address is written as a, b, c, d, e,
the a is a number of the first digit corresponding to the first digit selection signal,
the b is a number of the second digit corresponding to the second digit selection signal,
the c is a number of the third digit corresponding to the third digit selection signal,
the d is a number of the fourth digit corresponding to the fourth digit selection signal, and
the e is a number of the fifth digit corresponding to the fifth digit selection signal.

11. A method for providing an application operating in conjunction with a number URL service providing server executing a method for providing a number URL service, wherein the number URL service providing server executes a method according to claim 1.

* * * * *